(12) United States Patent
Pichler

(10) Patent No.: US 11,126,906 B2
(45) Date of Patent: Sep. 21, 2021

(54) TRANSPONDER AND CORRESPONDING OPERATING METHOD

(71) Applicant: NXP B.V., Eindhoven (NL)

(72) Inventor: Thomas Pichler, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/893,652

(22) Filed: Jun. 5, 2020

(65) Prior Publication Data
US 2020/0394487 A1 Dec. 17, 2020

(30) Foreign Application Priority Data
Jun. 11, 2019 (EP) ...................................... 19179550

(51) Int. Cl.
*G06K 19/07* (2006.01)
(52) U.S. Cl.
CPC ................................ *G06K 19/0726* (2013.01)
(58) Field of Classification Search
CPC ................................................ G06K 19/0726
USPC ........................................................ 235/492
See application file for complete search history.

(56) References Cited

U.S. PATENT DOCUMENTS

| 8,159,291 B2 | 4/2012 | Arrigo |
| 2006/0220794 A1 | 10/2006 | Zhu |
| 2007/0115098 A1 | 5/2007 | Dobkin |
| 2008/0180224 A1* | 7/2008 | Klapf ...................... H04L 27/08 340/10.4 |
| 2017/0169258 A1* | 6/2017 | Neffe .................. G06K 19/0712 |
| 2019/0036568 A1* | 1/2019 | Kovacic ............. G06K 7/10366 |

FOREIGN PATENT DOCUMENTS

| EP | 2171838 B1 | 4/2010 |
| EP | 2330538 A1 | 6/2011 |
| EP | 2431925 B1 | 4/2013 |
| FR | 2900752 B1 | 11/2017 |
| JP | 4146343 B2 | 3/2005 |

* cited by examiner

*Primary Examiner* — Daniel A Hess

(57) ABSTRACT

In accordance with a first aspect of the present disclosure, a radio frequency identification (RFID) transponder is provided, comprising a modulator and a controller, wherein: the modulator is configured to generate a modulated signal to be transmitted to an external RFID reader; the controller is configured to increase a transmitter impedance during a first period of time; the controller is configured to decrease the transmitter impedance by enabling the modulator during a second period of time. In accordance with a second aspect of the present disclosure, a corresponding method of operating a radio frequency identification (RFID) transponder is conceived.

20 Claims, 5 Drawing Sheets

# TRANSPONDER AND CORRESPONDING OPERATING METHOD

CROSS-REFERENCE TO RELATED APPLICATIONS

This application claims priority under 35 U.S.C. § 119 to European Patent Application No. 19179550.9, filed on Jun. 11, 2019, the contents of which are incorporated by reference herein.

TECHNICAL FIELD

The present disclosure relates to a transponder. Furthermore, the present disclosure relates to a corresponding method of operating a transponder.

BACKGROUND

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders.

SUMMARY

In accordance with a first aspect of the present disclosure, a radio frequency identification (RFID) transponder is provided, comprising a modulator and a controller, wherein: the modulator is configured to generate a modulated signal to be transmitted to an external RFID reader; the controller is configured to increase a transmitter impedance during a first period of time; the controller is configured to decrease the transmitter impedance by enabling the modulator during a second period of time.

In an embodiment, the controller is configured to increase the transmitter impedance by disabling a low-impedance path within the RFID transponder.

In an embodiment, the controller is configured to increase the transmitter impedance by disabling a low-dropout, LDO, regulator of the RFID transponder.

In an embodiment, the LDO regulator is disabled by opening a first switch.

In an embodiment, the controller is configured to increase the transmitter impedance by disabling a voltage limiter of the RFID transponder.

In an embodiment, the voltage limiter is disabled by opening a second switch.

In an embodiment, the modulator is enabled by closing a third switch.

In an embodiment, the controller is configured to repeatedly increase the transmitter impedance.

In an embodiment, the controller is configured to disable the modulator after the second period of time.

In an embodiment, the RFID transponder is an RFID tag.

In accordance with a second aspect of the present disclosure, a method of operating a radio frequency identification (RFID) transponder is conceived, the RFID transponder comprising a modulator and a controller, the method comprising: the modulator generates a modulated signal to be transmitted to an external RFID reader; the controller increases a transmitter impedance during a first period of time; the controller decreases the transmitter impedance by enabling the modulator during a second period of time.

In an embodiment, the controller repeatedly increases the transmitter impedance.

In an embodiment, the controller increases the transmitter impedance by disabling a low-impedance path within the RFID transponder.

In an embodiment, the controller increases the transmitter impedance by disabling a low-dropout, LDO, regulator of the RFID transponder.

In an embodiment, the controller increases the transmitter impedance by disabling a voltage limiter of the RFID transponder.

DESCRIPTION OF DRAWINGS

Embodiments will be described in more detail with reference to the appended drawings, in which.

DESCRIPTION OF EMBODIMENTS

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders. RFID communication may be based on inductive coupling. The communication between an RFID reader and an RFID transponder, such as an RFID tag, is often realized by means of load modulation and can be split into a forward link and a return link. More specifically, the RFID reader may transmit commands to the RFID transponder through a forward link, and the RFID transponder may transmit responses to those commands back to the RFID reader through a return link. The RFID transponder contains a modulator, which load modulates a carrier signal. Different types of load modulation exist, for example active load modulation (ALM) and passive load modulation (PLM). In practice, the strength of the return link may be low, which has a negative impact on the communication between the RFID transponder and the RFID reader.

Figure 1:
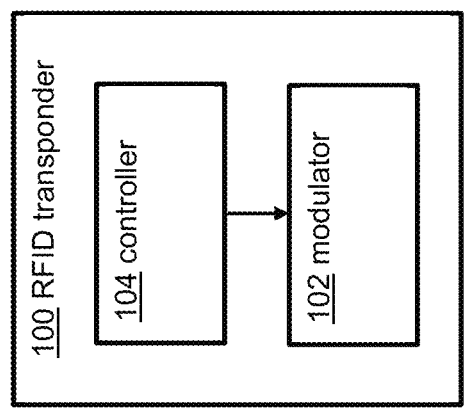
FIG. 1 shows an illustrative embodiment of an RFID transponder.

FIG. 1 shows an illustrative embodiment of a radio frequency identification (RFID) transponder. The RFID transponder 100 includes a modulator 102 controlled by a controller 104. The modulator 102 is configured to generate a modulated signal to be transmitted to an external RFID reader (not shown). Furthermore, the controller 104 is configured to increase a transmitter impedance during a first period of time. It is noted that the increase of the transmitter impedance correlates with a decreased load on the RFID transponder. In addition, the controller 104 is configured to decrease the transmitter impedance by enabling the modulator 102 during a second period of time. Thus, during this second period, the load on the RFID transponder is effectively increased. In this way, the load amplitude can be increased, which in turn increases the strength of the return link.

It is noted that an RFID transponder typically comprises an integrated circuit and an antenna coupled to the integrated circuit. As used herein, the term "transmitter impedance" refers to the impedance of the integrated circuit. The impedance of the integrated circuit is formed by the impedance of the various components of the integrated circuit, as will be explained with reference to FIG. 6 and FIG. 7. Furthermore, it is noted that the feature of increasing the transmitter impedance before decreasing it using the modulator does not need to be used all the time. In other words, the transponder may also be configured to behave like a conventional transponder when the feature is not active. In an embodiment, the controller 104 is configured to repeatedly increase the transmitter impedance. For example, the transmitter impedance may be increased each time before the modulator is enabled.

Figure 2:
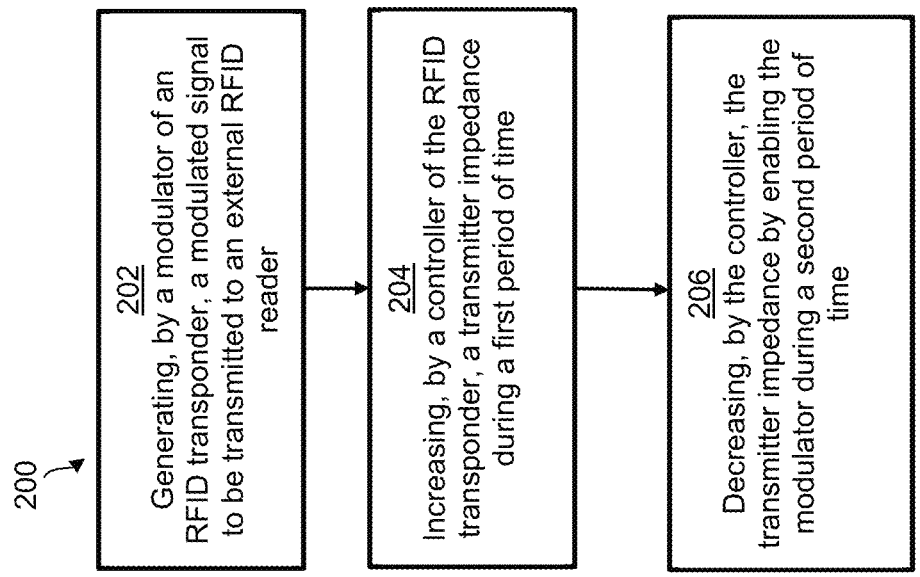
FIG. 2 shows an illustrative embodiment of a method of operating an RFID transponder.

FIG. 2 shows an illustrative embodiment of a method 200 of operating a transponder of the kind set forth. The method 200 comprises the following steps. At 202, the modulator 102 generates a modulated signal to be transmitted to an external RFID reader. Furthermore, at 204, the controller increases the transponder impedance during a first period of time. During this first period of time, the modulator is not yet enabled. In other words, during the first period of time, the carrier wave generated by the RFID reader is not being modulated by the RFID transponder. Then, at 206, the controller decreases the transmitter impedance by enabling the modulator during a second period of time. Thus, during the second period of time, the carrier wave generated by the RFID reader is being modulated by the RFID transponder.

Figure 3:
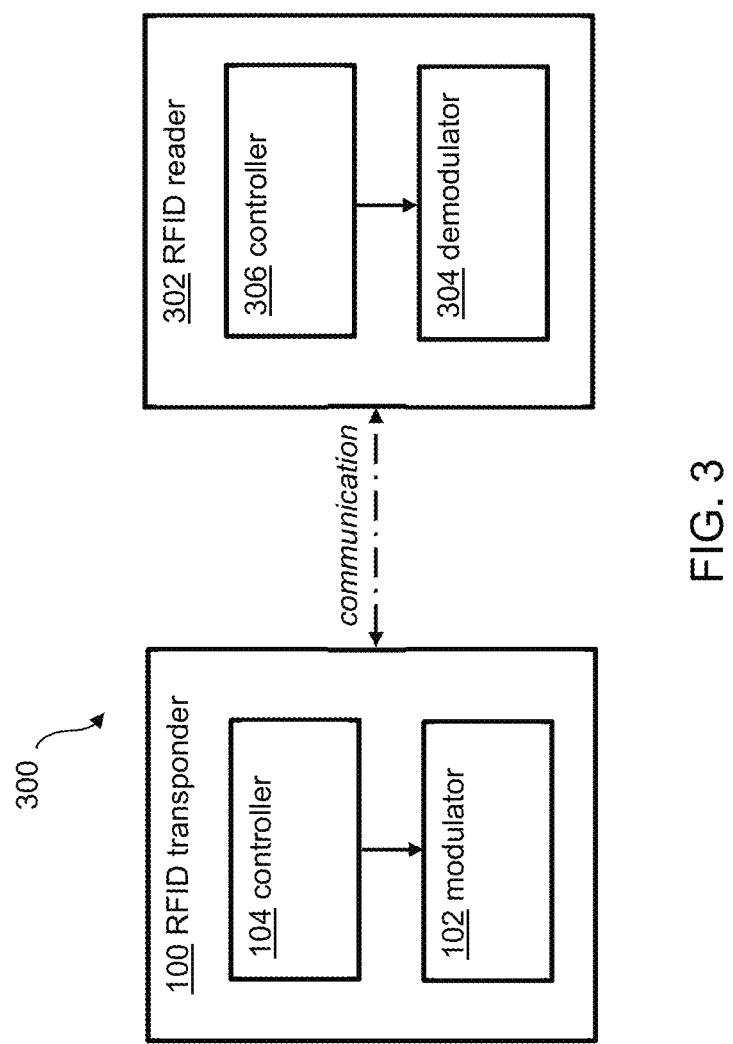
FIG. 3 shows an illustrative embodiment of an RFID communication system.

FIG. 3 shows an illustrative embodiment of an RFID communication system 300 in which the RFID transponder 100 is used. The communication system 300 comprises an RFID transponder 100 of the kind set forth and an RFID reader 302 which communicate with each other. The RFID transponder 100 includes the modulator 102 controlled by the controller 104. Similarly, the RFID reader 302 includes a demodulator 304 controller by a controller 306. In operation, the RFID transponder 100 modulates a carrier wave generated by the RFID reader 302, resulting in a modulated signal. To generate the modulated signal, a conventional transponder either increases or decreases the impedance. In practice, the strength of the return link is limited by the voltage drop of the antenna coil (not shown) of the RFID transponder 100. The voltage drop depends on the strength of the field generated by the RFID reader 302. Thus, a low field strength typically results in a low strength of the return link. As mentioned above, the presently disclosed transponder and corresponding method of operating a transponder increase the strength of the return link.

Figure 4:
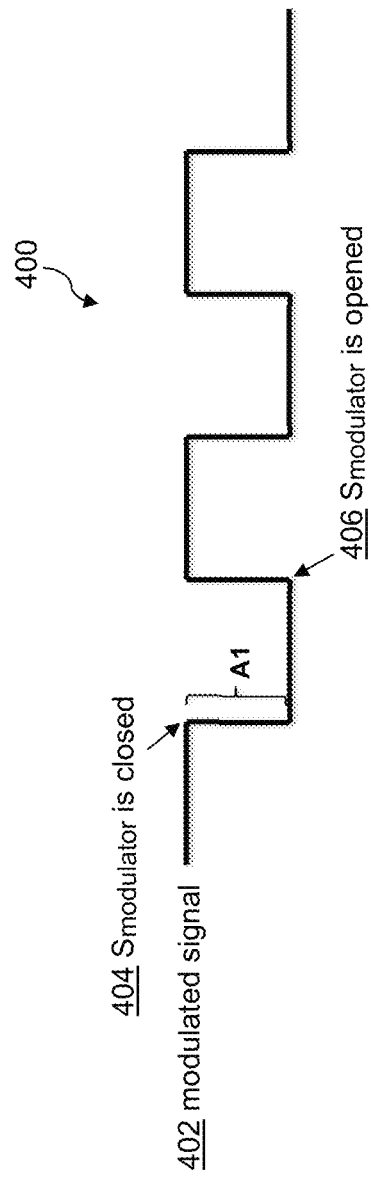
FIG. 4 shows an example of a controlled modulation.

FIG. 4 shows an example of a controlled modulation 400. In particular, a conventional controlled modulation 400 is shown. A modulated signal 402 is generated by alternately closing 404 and opening 406 a switch $S_{modulator}$. When the switch $S_{modulator}$ is closed, the modulator is effectively enabled and the transmitter impedance is decreased. This, in turn, results in an increase of the load on the RFID transponder. Then, when the switch $S_{modulator}$ is opened, the modulator is effectively disabled and the transmitter impedance is increased. This, in turn, results in an decrease of the load on the RFID transponder. The load amplitude A1 is the difference between the maximum load (when the modulator is enabled) and the minimum load (when the modulator is disabled).

Figure 5:
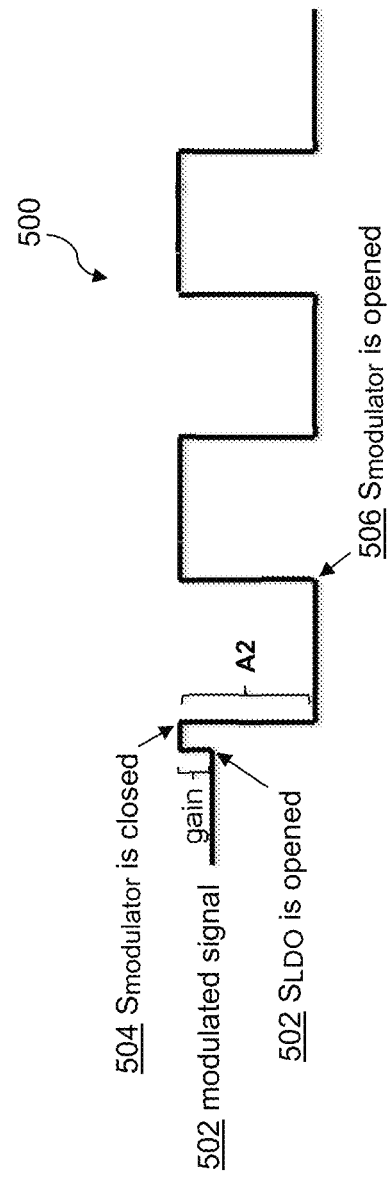
FIG. 5 shows an illustrative embodiment of a controlled modulation.

FIG. 5 shows an illustrative embodiment of a controlled modulation 500. In contrast to the conventional controlled modulation shown in FIG. 4, the controlled modulation 500 shown in FIG. 5 includes a step of increasing the transmitter impedance during a first period of time, before enabling the modulator. In particular, a modulated signal 502 is generated by alternately closing 504 and opening 506 a switch $S_{modulator}$. When the switch $S_{modulator}$ is closed, the modulator is effectively enabled and the transmitter impedance is decreased. This, in turn, results in a increase of the load on the RFID transponder. Then, when the switch $S_{modulator}$ is opened, the modulator is effectively disabled and the transmitter impedance is increased. This, in turn, results in an decrease of the load on the RFID transponder. However, before closing 504 the switch $S_{modulator}$ for the first time, a switch $S_{LDO}$ is opened. This effectively disables a low-dropout (LDO) regulator of the RFID transponder, which in turn increases the transmitter impedance. By disabling the LDO regulator the transmitter impedance can easily be increased. As shown in FIG. 5, the decreased load achieved by opening the switch $S_{LDO}$ results in a higher maximum load amplitude on the RFID transponder. Thus, the load amplitude A2 is higher than the amplitude A1 achieved by the controlled modulation shown in FIG. 4. The difference between A2 and A1 is referred to as a gain. The increased load amplitude, in turn, increases the strength of the return link. In another implementation, a voltage limiter of the RFID transponder is disabled. This has a similar effect as disabling the LDO regulator, i.e. it increases the transmitter impedance before the modulator is enabled. Thus, in an embodiment, the controller is configured to increase the transmitter impedance by disabling a low-impedance path within the RFID transponder. This embodiment enables practical and effective implementations. For instance, the transmitter impedance can easily be increased by disabling the LDO regulator and/or the voltage limiter of the RFID transponder. This, in turn, can easily be realized by opening switches between those components and an antenna of the RFID transponder. Similarly, the modulator can easily be enabled by closing a switch between the modulator and the antenna, and it can easily be disabled by closing said switch.

In particular, under normal operation the switch $S_{LDO}$ is closed. To increase the load amplitude the RFID transponder decreases the load as a first step, by reducing the consumed energy (i.e., $S_{LDO}$ is opened). This correlates with an increased impedance and amplitude of the RF field. The limitation of this increase is defined by the coil resistance of the transponder or the lowest ohmic parallel path in the system. After some time the transponder increases the load to a minimum by enabling the modulator (i.e., $S_{modulator}$ is closed). After some time the modulator is disabled (i.e., $S_{modulator}$ is opened). This again leads the field to increase, due to a decreased load. The increase of the impedance as a first step leads to an increased load amplitude.

Figure 6:
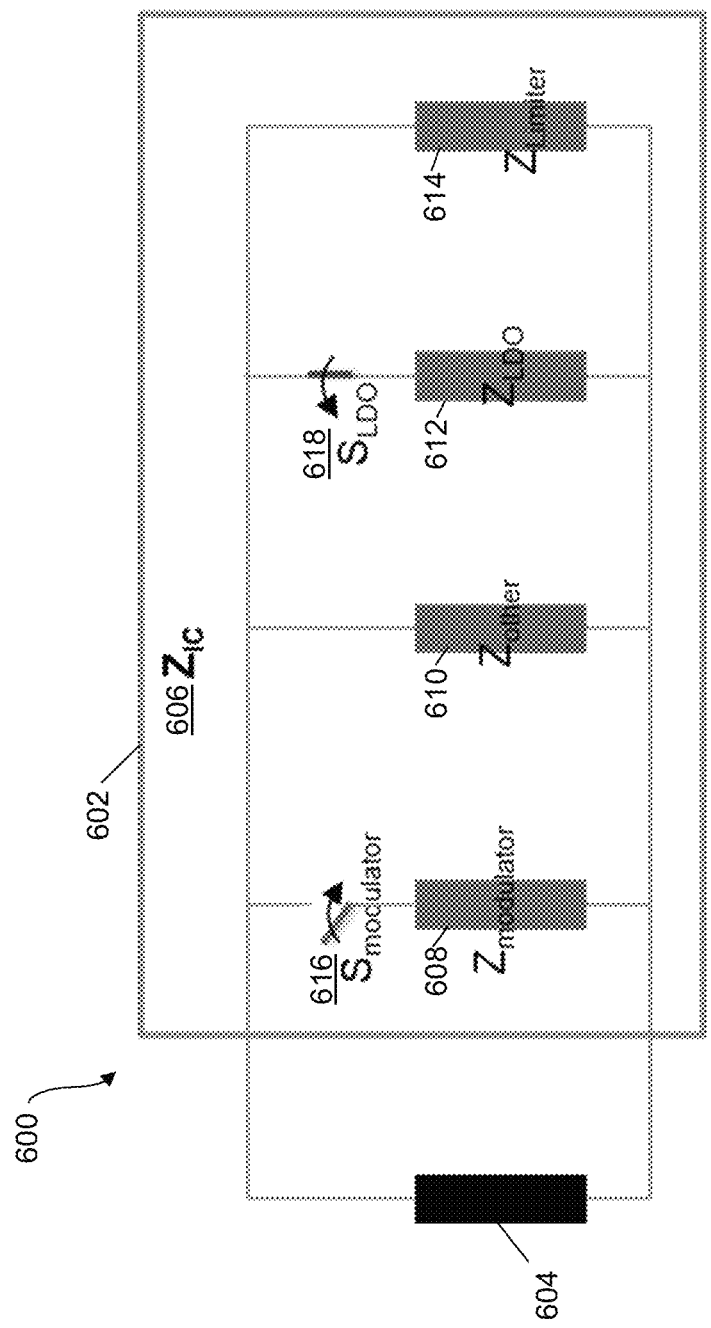
FIG. 6 shows an impedance model of an RFID transponder.

FIG. 6 shows an impedance model 600 of an RFID transponder of the kind set forth. The transponder comprises an integrated circuit 602 and an antenna 604 which are operatively coupled to each other. The transmitter impedance 606 (i.e. the impedance of the whole integrated circuit) is modeled as the impedance of the modulator 608, the impedance of the LDO regulator 612, the impedance of the voltage limiter 614, and the impedance of other components of the transponder 610 coupled in parallel. By closing and opening the switches 616, 618 the transmitter impedance can be controlled. In particular, the transmitter impedance is increased during a first period of time, by opening the LDO switch 618. Then, in a second period of time, the transmitter impedance is decreased to a minimum by enabling the modulator (i.e. by closing the modulator switch 616). It is noted that, in the second period, the LDO switch may be closed again or it may remain open. Since the modulator dominates in this second period, closing and opening the LDO switch will have a negligible effect on the impedance.

Figure 7:
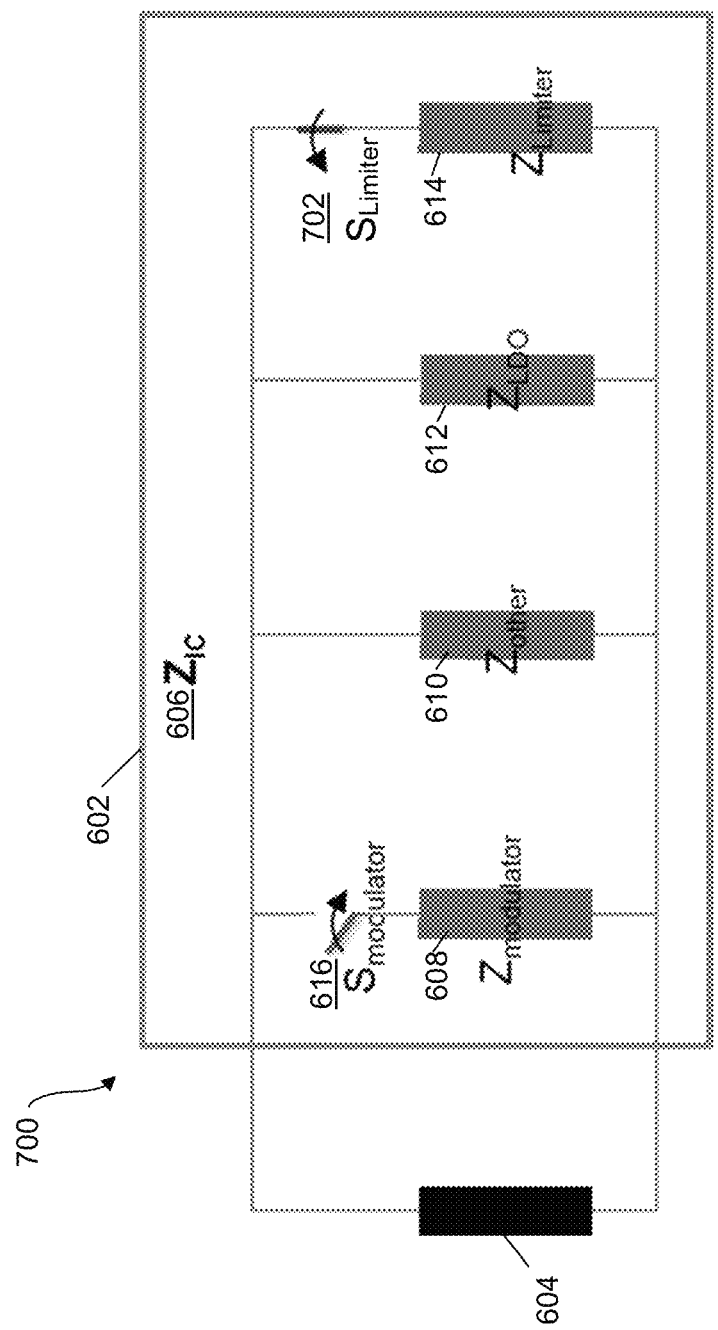
FIG. 7 shows another impedance model of an RFID transponder.

FIG. 7 shows another impedance model 700 of an RFID transponder of the kind set forth. Again, the transponder comprises an integrated circuit 602 and an antenna 604 which are operatively coupled to each other. The transmitter impedance 606 (i.e. the impedance of the whole integrated circuit) is modeled as the impedance of the modulator 608, the impedance of the LDO regulator 612, the impedance of the voltage limiter 614, and the impedance of other components of the transponder 610 coupled in parallel. By closing and opening the switches 616, 702 the transmitter impedance can be controlled. In particular, the transmitter impedance is increased during a first period of time, by opening the voltage limiter switch 702. Then, in a second period of time, the transmitter impedance is decreased to a minimum by enabling the modulator (i.e. by closing the modulator switch 616).

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 RFID transponder
102 modulator
104 controller
200 method of operating an RFID transponder
202 generating, by a modulator of an RFID transponder, a modulated signal to be transmitted to an external RFID reader
204 increasing, by a controller of the RFID transponder, a transmitter impedance during a first period of time
206 decreasing, by the controller, the transmitter impedance by enabling the modulator during a second period of time
300 RFID communication system
302 RFID reader
304 demodulator
306 controller
400 controlled modulation
402 modulated signal
404 $S_{modulator}$ is closed
406 $S_{modulator}$ is opened
500 controlled modulation
502 modulated signal
502 $S_{LDO}$ is opened
504 $S_{modulator}$ is closed
506 $S_{modulator}$ is opened
600 impedance model
602 transponder IC
604 antenna
606 IC impedance
608 modulator impedance
610 impedance of other IC components
612 LDO impedance
614 limiter impedance
616 modulator switch
618 LDO switch
700 impedance model
702 limiter switch

The invention claimed is:

1. A radio frequency identification, RFID, transponder, comprising a modulator and a controller, wherein:
the modulator is configured to generate a modulated signal to be transmitted to an external RFID reader;
the controller is configured to increase a transmitter impedance during a first period of time;
the controller is configured to decrease the transmitter impedance by enabling the modulator during a second period of time; and
the controller is configured to increase the transmitter impedance by disabling a low-dropout (LDO), regulator of the RFID transponder.

2. The RFID transponder of claim 1, wherein the controller is configured to increase the transmitter impedance by disabling a low-impedance path within the RFID transponder.

3. The RFID transponder of claim 1, wherein disabling the LDO regulator of the RFID transponder results in a higher load amplitude for a load of the RFID transponder compared to when the LDO is enabled.

4. The RFID transponder of claim 1, wherein the LDO regulator is disabled by opening a first switch.

5. The RFID transponder of claim 1, wherein the modulator is enabled by closing a third switch.

6. The RFID transponder of claim 1, wherein the controller is configured to repeatedly increase the transmitter impedance.

7. The RFID transponder of claim 1, wherein the controller is configured to disable the modulator after the second period of time.

8. The RFID transponder of claim 1, being an RFID tag.

9. A radio frequency identification, RFID, transponder, comprising a modulator and a controller, wherein:
   the modulator is configured to generate a modulated signal to be transmitted to an external RFID reader;
   the controller is configured to increase a transmitter impedance during a first period of time;
   the controller is configured to decrease the transmitter impedance by enabling the modulator during a second period of time; and
   the controller is configured to increase the transmitter impedance by disabling a voltage limiter of the RFID transponder.

10. The RFID transponder of claim 9, wherein the voltage limiter is disabled by opening a second switch.

11. A method of operating a radio frequency identification, RFID, transponder, the RFID transponder comprising a modulator and a controller, the method comprising:
    the modulator generates a modulated signal to be transmitted to an external RFID reader;
    the controller increases a transmitter impedance during a first period of time;
    the controller decreases the transmitter impedance by enabling the modulator during a second period of time; and
    the controller increases the transmitter impedance by disabling one of either a low-dropout, (LDO) regulator or a voltage limiter of the RFID transponder.

12. The method of claim 11, wherein the controller repeatedly increases the transmitter impedance.

13. The method of claim 11, wherein the controller increases the transmitter impedance by disabling a low-impedance path within the RFID transponder.

14. The method of claim 11, wherein disabling one of either the LDO regulator or the voltage limiter of the RFID transponder results in a higher load amplitude for a load of the RFID transponder compared when either the LDO or voltage limiter are enabled.

15. The method of claim 14, wherein the LDO regulator is disabled by opening a first switch.

16. The method of claim 11, wherein the RFID transponder is a near field communication (NFC) transponder.

17. The method of claim 11, wherein the voltage limiter is disabled by opening a second switch.

18. The method of claim 11, wherein the modulator is enabled by closing a third switch.

19. The method of claim 11, wherein the controller disables the modulator after the second period of time.

20. The method of claim 11, wherein the RFID transponder is an RFID tag.

* * * * *